United States Patent
Rhee et al.

(10) Patent No.: US 7,940,739 B2
(45) Date of Patent: May 10, 2011

(54) COMPLEX MULTIPLEXING TRANSMISSION/RECEPTION APPARATUS AND METHOD IN A WIRELESS COMMUNICATION SYSTEM

(75) Inventors: Jong-Hun Rhee, Suwon-si (KR); Dong-Hee Kim, Yongin-si (KR); Sang-Jin Lee, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1051 days.

(21) Appl. No.: 11/598,200

(22) Filed: Nov. 13, 2006

(65) Prior Publication Data

US 2007/0147439 A1    Jun. 28, 2007

(30) Foreign Application Priority Data

Nov. 11, 2005    (KR) .................. 10-2005-0108267

(51) Int. Cl.
*H04B 7/216* (2006.01)
*H04B 1/00* (2006.01)
(52) U.S. Cl. ......... 370/342; 370/335; 370/441; 375/130
(58) Field of Classification Search .............. 370/320, 370/335, 342, 345, 441; 375/130–153
See application file for complete search history.

(56) References Cited

U.S. PATENT DOCUMENTS

| 5,602,833 A | 2/1997 | Zehavi .......................... 370/209 |
| 5,914,950 A * | 6/1999 | Tiedemann et al. .......... 370/348 |
| 2002/0097697 A1 * | 7/2002 | Bae et al. ...................... 370/335 |

FOREIGN PATENT DOCUMENTS

| EP | 0 809 364 A2 | 11/1997 |
| EP | 1786131 A1 | 5/2007 |
| JP | 2005-167834 A | 6/2005 |
| KR | 10-2004-0054444 A | 6/2004 |
| WO | WO/03/032511 A1 | 4/2003 |

OTHER PUBLICATIONS

Mitsugi J. et al.; "S-band digital mobile satellite broadcasting system"; Vehicular Technology Conference, 1999; Sep. 1999vol. 5; pp. 2755-2759.
Ito, et al. *M-Sequence-Based M-ary/SS/CDMA System Using Blocked Viterbi Decoding and Accurate SNIR Measurement Techniques for High Bit Rate Wireless Communication Systems*, Aug. 2001, pp. 1421-1432, vol. J84-B, No. 8, The Institute of Electronics, Information and Communication Engineers, Korea.

* cited by examiner

*Primary Examiner* — Lester Kincaid
*Assistant Examiner* — Daniel Lai
(74) *Attorney, Agent, or Firm* — Roylance, Abrams, Berdo & Goodman, L.L.P.

(57) ABSTRACT

An apparatus and method for transmitting data in a wireless communication system using Code Division Multiplexing (CDM) are provided. A code controller distinguishes a Walsh code used for spreading during data transmission and a Walsh code unused for spreading based on a signal-to-interference ratio required by the system, and separately provides the Walsh codes. A CDM multiplexer CDM-multiplexes input data using the Walsh code used for spreading, provided from the code controller. A code modulator modulates input data using the Walsh code unused for spreading, provided from the code controller. A multiplexer multiplexes outputs of the CDM multiplexer and the code modulator.

25 Claims, 14 Drawing Sheets

COMPLEX MULTIPLEXING TRANSMISSION/RECEPTION APPARATUS AND METHOD IN A WIRELESS COMMUNICATION SYSTEM

CROSS-REFERENCE TO RELATED APPLICATION

This application claims the benefit under 35 U.S.C. §119 (a) of Korean Patent Application filed in the Korean Intellectual Property Office on Nov. 11, 2005 and assigned Serial No. 2005-108267, the entire disclosure of which is hereby incorporated by reference.

BACKGROUND OF THE INVENTION

1. Field of the Invention

The present invention relates generally to a multiplexing transmission apparatus and method in a wireless communication system. More particularly, the present invention relates to a multiplexing transmission apparatus and method using modulation and spreading.

2. Description of the Related Art

Generally, wireless communication systems use multiplexing techniques to transmit data. The multiplexing techniques are classified into Time Division Multiplexing (TDM), Code Division Multiplexing (CDM), Frequency Division Multiplexing (FDM), and the like. The multiplexing techniques are one method used for distinguishing services or users. The TDM technique is a method for dividing a specific time interval into several time slots, and transmitting data of a specific user or service over one or more of the divided time slots. The FDM technique is a method for transmitting data of a specific user or service over a specific frequency band among a plurality of predetermined frequency bands. The CDM technique is a method for transmitting data of a specific user or service by spreading the data using one or more codes among a plurality of predetermined codes.

A detailed description will now be made of the CDM technique among the multiplexing techniques. As described above, the CDM technique, that is, the spreading multiplexing technique using codes, is generally used for distinguishing services using spreading codes, or is used as a multi-code technique for allocating a plurality of codes to one service. A modulation technique using such multiplexing techniques uses a method for selecting and transmitting one of spreading codes in an input data information stream.

The CDM method is applied to various systems, particularly to a Code Division Multiple Access (CDMA) mobile communication system and a Satellite Digital Multimedia Broadcasting (S-DMB) system.

The S-DMB system will now be described with reference to the accompanying drawings.

FIG. 1 is a block diagram of a data transmitter according to the S-DMB standard.

Referring to FIG. 1, the data transmitter includes transmission data generators 110, 120 and 130 for generating transmission service data, a control data generator 140 for generating transmission control data, and a CDM multiplexer 150. Among the elements, the transmission data generators 110, 120 and 130 are equal in structure, therefore only one of the transmission data generators will be described, for clarity and conciseness.

If transmission payload data is input to the transmission data generator 110, a Reed-Solomon (RS) encoder 111 performs RS coding on the input data. The RS-coded symbols are input to a first interleaver 112, which is a byte interleaver for interleaving symbols in bytes. The first interleaver 112 interleaves the input data, and outputs the interleaved data to a convolutional encoder 113. Then the convolutional encoder 113 re-encodes the interleaved symbols, and generates coded symbols. The symbols convolutional-coded by the convolutional encoder 113 are input to a second interleaver 114, which is a bit interleaver for interleaving symbols in bits. The output symbols interleaved by the second interleaver 114 are input to the CDM multiplexer 150.

Compared with the transmission data generator 110, the control data generator 140 for generating control data does not include the second interleaver 114. That is, an RS encoder 141, a first interleaver 142 and a convolutional encoder 143 in the control data generator 140 correspond to the RS encoder 111, the first interleaver 112 and the convolutional encoder 113 in the transmission data generator 110. Therefore, in the control data generator 140, the convolutional-coded symbols are input to the CDM multiplexer 150. The symbols output from the control data generator 140 are control data on a pilot channel.

The CDM multiplexer 150 receives the symbols from the transmission data generators 110, 120 and 130, and the control data generator 140, and performs CDM on the received symbols using received pilot symbols. That is, if each of the data generators 110, 120, 130 and 140 is assumed to be one channel, the CDM multiplexer 150 CDM-multiplexes the symbols received from the channels using Walsh codes, and outputs the CDM-multiplexed symbols to a modulator. According to the S-DMB standard, CDM performs multiplexing through orthogonal spreading using 64-length Walsh codes.

Therefore, in the S-DMB, the possible number of channels distinguishable by Walsh codes is 64. However, in the multi-path fading environment, some of the Walsh codes cannot be used for the multiplexing technique due to interference between channels.

FIG. 2 is a functional block diagram of a general Walsh modulator. With reference to FIG. 2, a description will now be made of a structure of the general Walsh modulator.

Referring to FIG. 2, a serial-to-parallel (S/P) converter 210 in the Walsh modulator converts input serial data into parallel data, and outputs the parallel data to a function processor 220. The function processor 220 converts the parallel data into different data depending on an arbitrary one-to-one (bijective) function f( ). If the converted data is denoted by 'm', the data 'm' is input to a Walsh generator 230, and the Walsh generator 230 generates Walsh codes $W^N(m)$ using the input data 'm'.

A detailed description will now be made of an operation of the Walsh modulator.

The total number of length-N Walsh codes is N. If each of the Walsh codes output from the Walsh generator 230 is denoted by $W^N(m)$, m is an element of $\{0, 1, 2, \ldots, N-1\}$. If $n=\log_2 N$, an index 'm' of a length-N Walsh code is expressed by a length-n bit stream. When there is an arbitrary one-to-one function f( ) in the function processor 220, a relationship between an input n-bit stream and the 'm' is defined by f( ). If an inverse function of f( ) is defined as g( ), a receiver selects a Walsh code generated from a transmitter among N Walsh codes, thereby finding a transmitted Walsh code index 'm' and detecting an n-bit transmission information stream through a relationship of the g( ).

As described above, in performing CDM transmission using length-64 Walsh codes, the S-DMB transmission technology cannot use some of the 64 Walsh channels due to interference occurring in the wireless channel environment like the multi-path fading environment, causing a waste of channels. In addition, because some of the Walsh channels cannot be used, the total transmission efficiency deteriorates. Such problems occur not only in the S-DMB communication system, but also in the CDM communication system.

Accordingly, there is a need for an improved apparatus and method with increased transmission efficiency in a wireless CDM communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for increasing the entire transmission efficiency in a wireless CDM communication system.

It is another aspect of exemplary embodiments of the present invention to provide an apparatus and method for preventing a waste of channels in a wireless CDM communication system.

It is further another aspect of exemplary embodiments of the present invention to provide an apparatus and method for increasing system capacity while maintaining compatibility with the existing method in a wireless CDM communication system.

It is yet another aspect of exemplary embodiments of the present invention to provide an apparatus and method for increasing a number of available channels without extension of Walsh codes in a wireless CDM communication system.

According to one aspect of exemplary embodiments of the present invention, there is provided an apparatus for transmitting data in a wireless communication system using Code Division Multiplexing (CDM), in which a code controller distinguishes a Walsh code used for spreading during data transmission and a Walsh code unused for spreading based on a signal-to-interference ratio required by the system, and separately providing the Walsh codes; a CDM multiplexer CDM-multiplexes input data using the Walsh code used for spreading, provided from the code controller; a code modulator modulates input data using the Walsh code unused for spreading, provided from the code controller; and a multiplexer multiplexes outputs of the CDM multiplexer and the code modulator.

According to another aspect of exemplary embodiments of the present invention, there is provided a method for transmitting data in a wireless communication system using Code Division Multiplexing (CDM), in which a Walsh code used for spreading during data transmission and a Walsh code unused for spreading based on a signal-to-interference ratio required by the system are distinguished, and the Walsh codes are separately provided; transmission data is CDM-multiplexed using the Walsh code used for spreading, when there is a need to CDM-multiplex the transmission data; transmission data is modulated using the Walsh code unused for spreading, when there is a need to code-modulate the transmission data; and the CDM-multiplexed signal and the code-modulated signal are multiplexed.

According to further another aspect of exemplary embodiments of the present invention, there is provided an apparatus for receiving data in a wireless communication system using Code Division Multiplexing (CDM), in which a code controller extracts a Walsh code used for code modulation and a Walsh code used for CDM multiplexing from a control signal in a received CDM-multiplexed signal; a CDM demultiplexer CDM-demultiplexes the CDM-multiplexed signal in a received multiplexed signal; and a code demodulator code-demodulates a code-modulated signal in the received multiplexed signal.

According to still another aspect of exemplary embodiments of the present invention, there is provided a method for demodulating data in a wireless communication system using Code Division Multiplexing (CDM), in which a Walsh code used for code modulation and a Walsh code used for CDM multiplexing are extracted from a control signal in a received CDM-multiplexed signal; the CDM-multiplexed signal in a received multiplexed signal is CDM-demultiplexed; and a code-modulated signal in the received multiplexed signal is code-demodulated.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The specification will present descriptions of an apparatus and method applied to a CDM system according to an exemplary embodiment of the present invention, and an apparatus and method applied to an S-DMB system according to an exemplary embodiment of the present invention. In addition, the specification will present a verification of the effects of an exemplary embodiment of the present invention.

Figure 1:
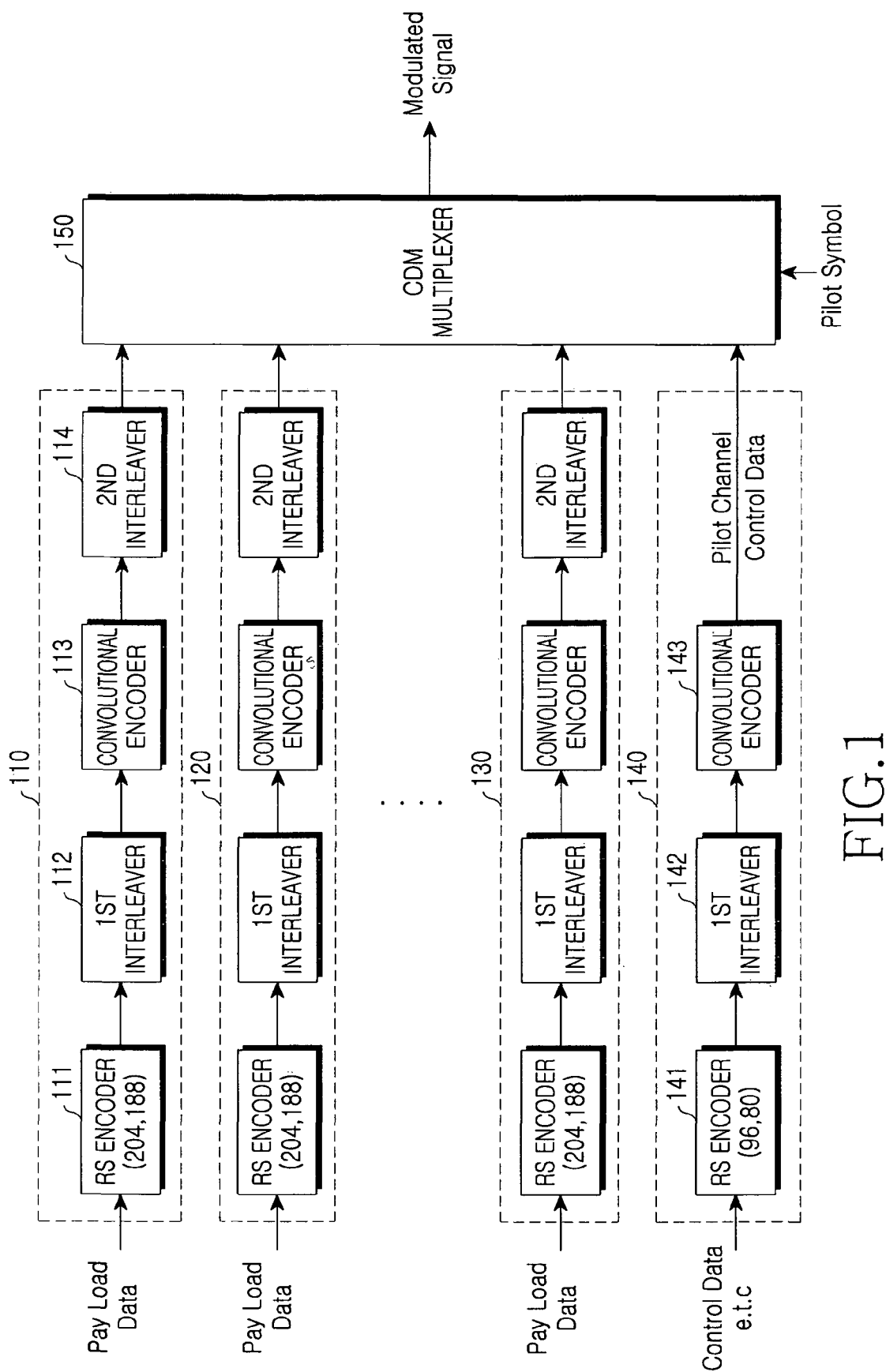
FIG. 1 is a block diagram of a data transmitter according to the S-DMB standard.
Figure 2:
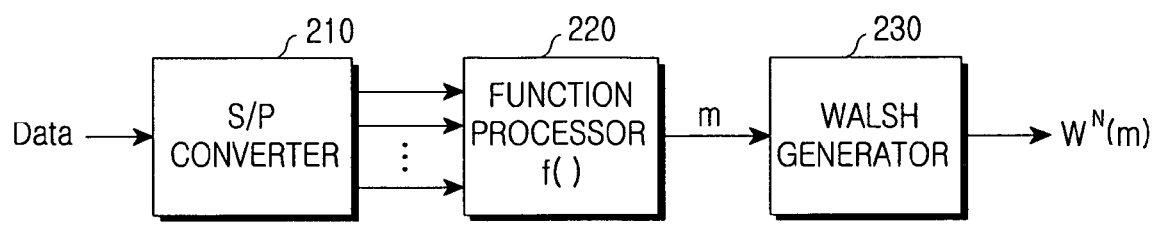
FIG. 2 is a functional block diagram of a general Walsh modulator.
Figure 3:
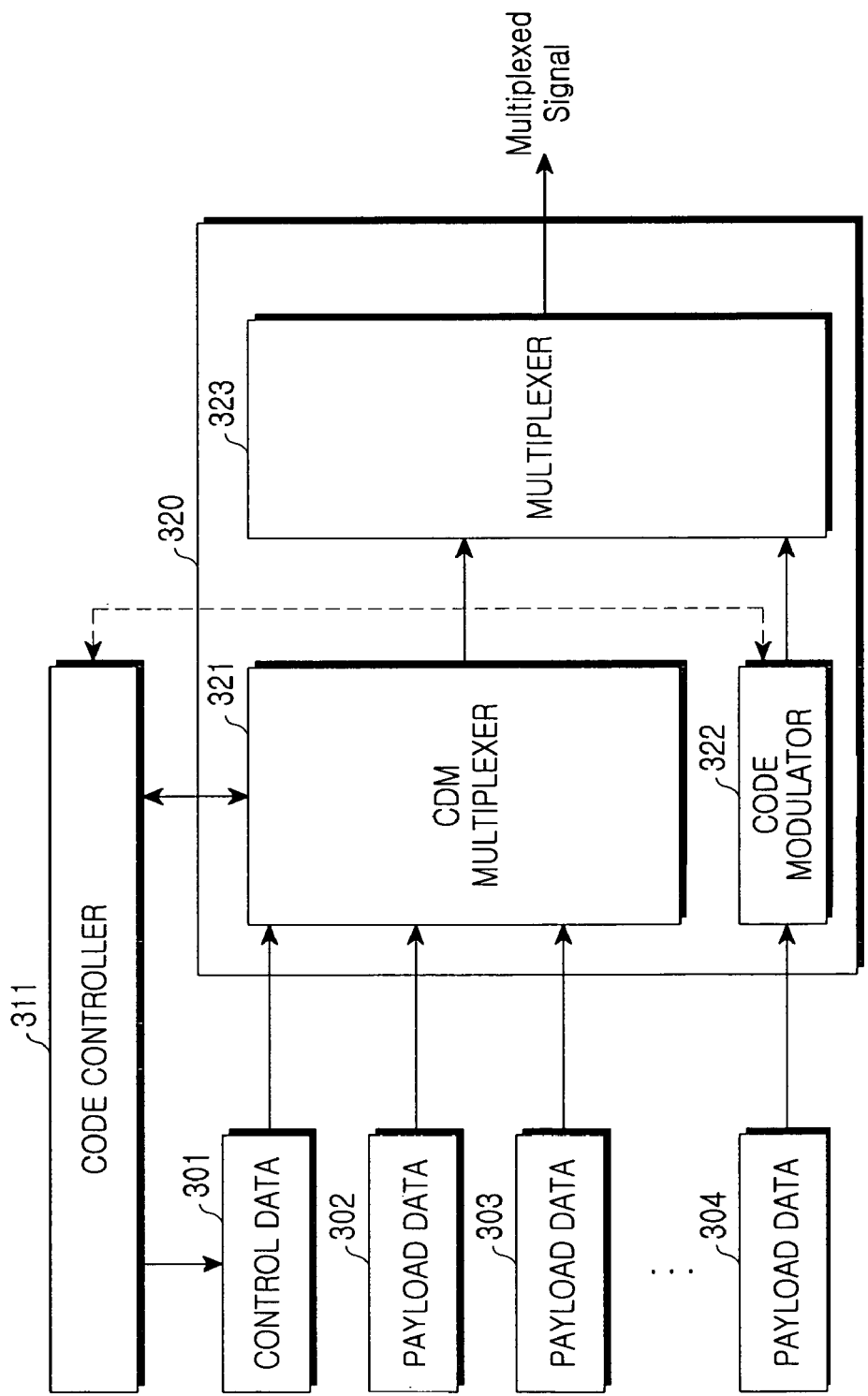
FIG. 3 is a block diagram for CDM multiplexing and code modulation according to an exemplary embodiment of the present invention.

FIG. 3 is a block diagram for CDM multiplexing and code modulation according to an exemplary embodiment of the present invention. With reference to FIG. 3, a description will now be made of a structure and operation of a CDM multiplexing/code modulation apparatus according to an exemplary embodiment of the present invention.

The CDM multiplexing/code modulation apparatus according to an exemplary embodiment of the present invention includes a code controller 311, and transmits transmission control data 310 and payload data 302, 303 and 304. A complex multiplexer 320 receives the above data, and performs complex multiplexing. A description will now be made of a structure of the complex multiplexer 320.

The complex multiplexer 320 includes a CDM multiplexer 321, a code modulator 322, and a multiplexer 323. The CDM multiplexer 321 performs the CDM operation described above. In other words, the CDM multiplexer 321 performs CDM on the payload data 302 to 303 and the control data 301 using available Walsh codes. For example, the CDM multiplexer 321 transmits data with the available codes taking the fading into consideration. The code modulator 322, under the control of the code controller 311, performs modulation using unavailable Walsh codes, and then outputs the results to the multiplexer 323. Then the multiplexer 323 multiplexes the symbols output from the CDM multiplexer 321 and the symbols output from the code modulator 322, and outputs a multiplexed signal.

Therefore, the code controller 311 selects the codes used for multiplexing and the codes used for modulation among all of the available codes. Information on the codes selected by the code controller 311 is provided to a receiver by the control data 301. Therefore, the code controller 311 provides the receiver with information on the codes used for modulation and the codes used for CDM multiplexing using the control data 301. As a result, the receiver can distinguish between the codes used for CDM multiplexing and the codes used for modulation. With reference to the accompanying drawings, a detailed description will now be made of the code modulation.

Figure 4:
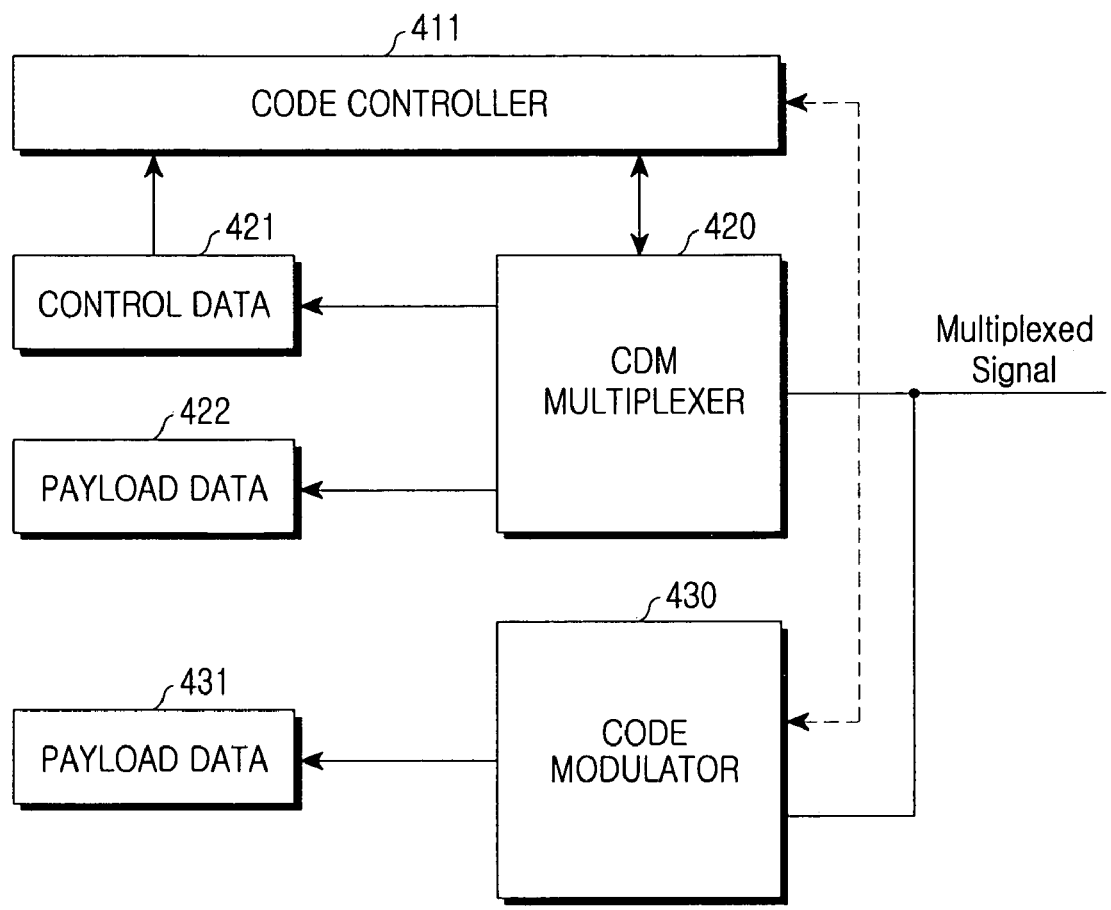
FIG. 4 is a block diagram of a receiver corresponding to the transmitter of FIG. 3 according to an exemplary embodiment of the present invention.

FIG. 4 is a block diagram of a receiver corresponding to the transmitter of FIG. 3 according to an exemplary embodiment of the present invention. With reference to FIG. 4, a description will now be made of a structure and operation of the receiver according to an embodiment of the present invention.

An operation following the transmission process of the transmitter was not described in FIG. 3. Therefore, an operation following a radio frequency (RF) reception process of the receiver will also not be described in FIG. 4 for clarity and conciseness. The multiplexed received signal is input to a CDM demultiplexer 420 and a code demodulator 430. The CDM demultiplexer 420 CDM-demultiplexes the CDM-multiplexed data in the input signals under the control of a code controller 411. As a result, the CDM demultiplexer 420 outputs control data 421, which was CDM-multiplexed before being transmitted as described in FIG. 3, and payload data 422 corresponding to the Walsh code allocated thereto. The code demodulator 430, under the control of the code controller 411, decodes the payload data that underwent code modulation before being transmitted according to an exemplary embodiment of the present invention, and outputs payload data 431.

The control data 421 is input to the code controller 411, and based thereon, the code controller 411 provides the Walsh codes used for CDM multiplexing and the Walsh codes used for code modulation. Therefore, the code controller 411 provides the Walsh codes used for CDM multiplexing to the CDM demultiplexer 420 and the Walsh codes used for code modulation to the code demodulator 430 using the control data 421.

A description will now be made of CDM multiplexing based on Binary Phase Shift Keying (BPSK) modulation according to an exemplary embodiment of the present invention, in which for Walsh modulation, a Walsh code is selected depending on input data.

Figure 5:
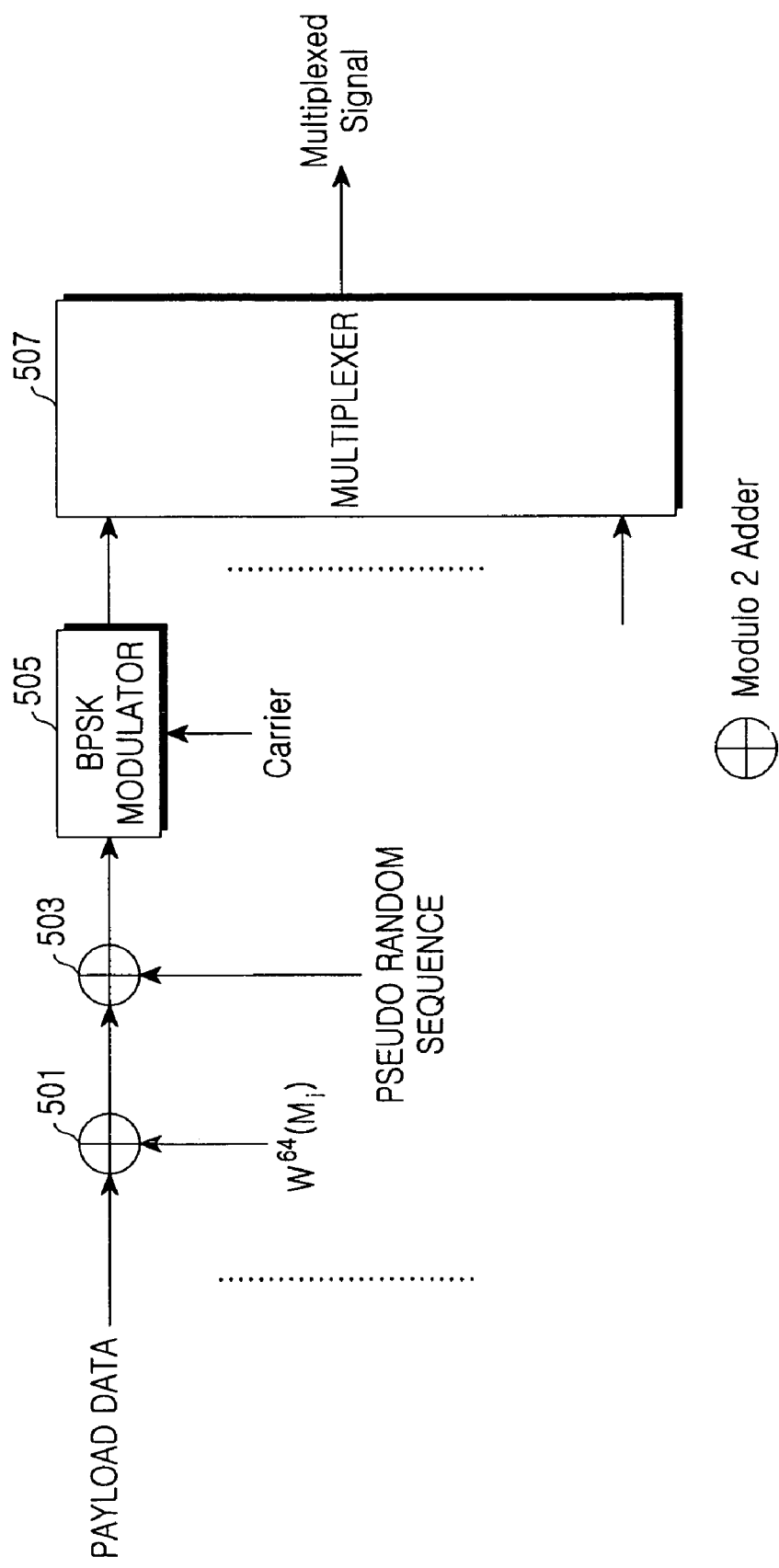
FIG. 5 is a block diagram of a CDM multiplexer that performs CDM multiplexing using BPSK modulation according to an exemplary embodiment of the present invention.

FIG. 5 is a block diagram of a CDM multiplexer that performs CDM multiplexing using BPSK modulation according to an exemplary embodiment of the present invention. With reference to FIG. 5, a description will now be made of a structure and operation of a CDM multiplexer that performs CDM multiplexing using BSPK modulation.

FIG. 5 shows, by way of example, data on a particular channel among a plurality of data channels input to the CDM multiplexer. Therefore, it should be noted that the same structures other than a multiplexer 507 are provided in parallel. Input payload data is input to a first modulo adder 501, and the first modulo adder 501 performs a modulo operation with a Walsh code $W^{64}(M_i)$ used for spreading the payload data. The first modulo adder 501 can be implemented with a modulo-2 adder. The modulo-calculated data is input to a second modulo adder 503, and the second modulo adder 503 performs a modulo operation on the output of the first modulo adder 501 and a pseudo random sequence. The second modulo adder 503 can also be implemented with a modulo-2 adder. The data modulo-calculated by the second modulo adder 503 is input to a BPSK modulator 505: The BPSK modulator 505 BPSK-modulates the input data using a carrier signal, and outputs the results to the multiplexer 507.

Similarly, the data processed for each of the other data channels is input to the multiplexer 507. When all of the data channels are input to the multiplexer 507, the multiplexer 507 multiplexes the input data channels, and outputs a multiplexed modulated signal. Of the above processes, the operation up to the BPSK modulator 505 corresponds to the process performed in the CDM multiplexer 321 of FIG. 3.

Figure 6:
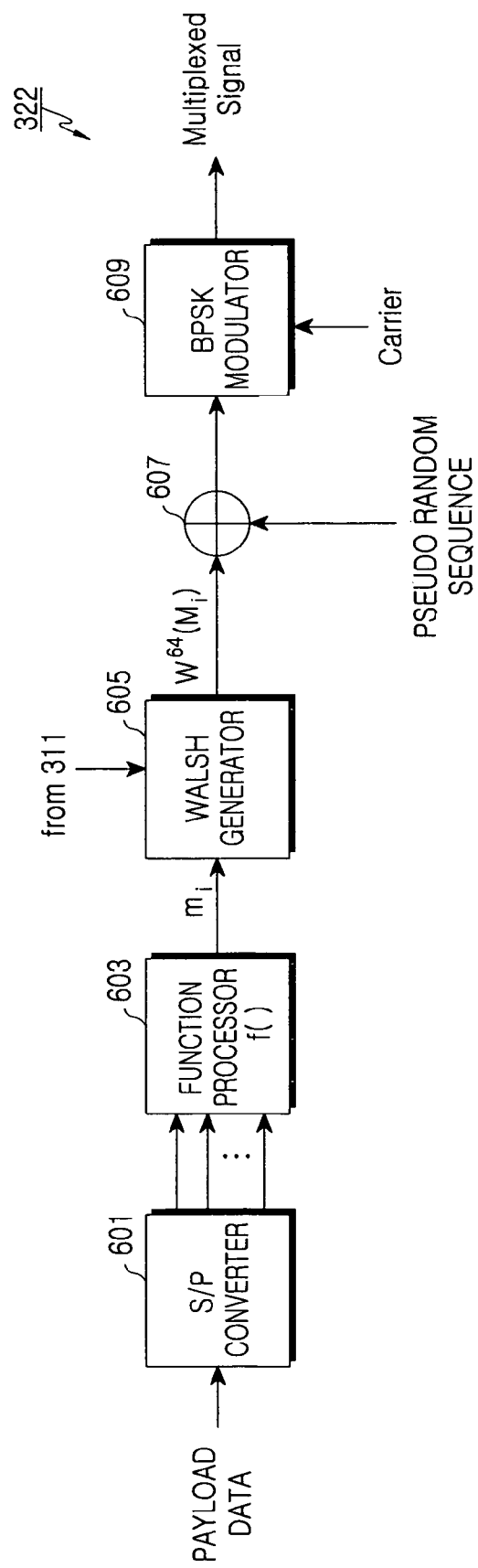
FIG. 6 is a block diagram of a code modulator using BPSK modulation according to an exemplary embodiment of the present invention.

With reference to FIG. 6, a description will now be made of an operation performed in the code modulator 322 according to an exemplary embodiment of the present invention.

FIG. 6 is a block diagram of a code modulator using BPSK modulation according to an exemplary embodiment of the present invention. With reference to FIG. 6, a detailed description will now be made of a structure and operation of a code modulator using BSPK modulation according to an exemplary embodiment of the present invention.

Transmission payload data is input to a serial-to-parallel (S/P) converter 601. The S/P converter 601 converts the serial input payload data into parallel data, and outputs the parallel data to a function processor 603. The function processor 603 generates a Walsh code index for the input data depending on a one-to-one (bijective) function as described above. If the generated Walsh code index is denoted by $m_i$, the Walsh index $m_i$ is input to a Walsh generator 605. Then the Walsh generator 605 generates a Walsh code corresponding to the corresponding Walsh index based on the control signal from the code controller 311 of FIG. 3. That is, a symbol $W^{64}(m_i)$ output from the Walsh generator 605 is input to a modulo adder 607, and the modulo adder 607 performs a modulo operation on a pseudo random sequence and the symbol $W^{64}(m_i)$ output from the Walsh generator 605. The reason for using the modulo adder 607 is to compensate a multi-path characteristic of the Walsh codes. That is, with the use of modulo addition, the Walsh codes are randomized by the pseudo random sequence to make up for the multi-path characteristic of the Walsh codes.

After randomizing the Walsh codes with the pseudo random sequence, the code modulator transmits the resulting data using the BPSK modulation, which is the transmission method described in FIG. 5. Therefore, the signal randomized by the pseudo random sequence is BPSK-modulated by a BPSK modulator 609, thereby outputting a modulated signal.

A description will now be made of structures of the receiver corresponding to the apparatuses of FIGS. 5 and 6.

Figure 7:
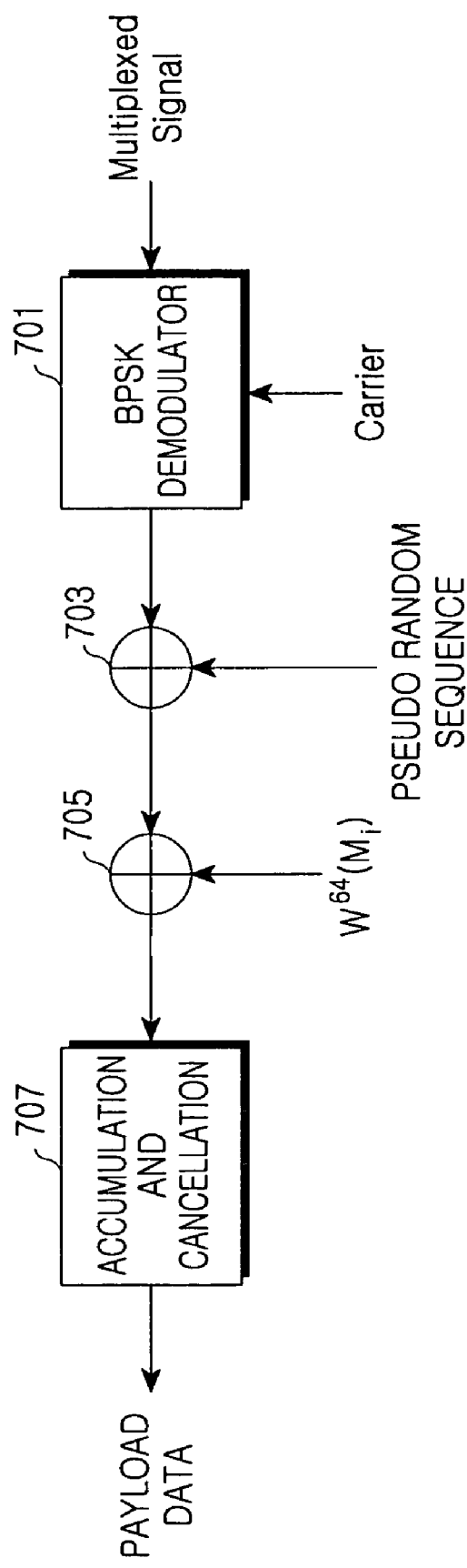
FIG. 7 is a block diagram of a receiver corresponding to the BPSK transmitter of FIG. 5 according to an exemplary embodiment of the present invention.

FIG. 7 is a block diagram of a receiver corresponding to the BPSK transmitter of FIG. 5 according to an exemplary embodiment of the present invention. With reference to FIG. 7, a description will now be made of a structure and operation of a receiver corresponding to the BPSK transmitter of FIG. 5 according to an exemplary embodiment of the present invention.

The received modulated signal is input to a BPSK demodulator 701 where it is demodulated together with a carrier. For the demodulation, BPSK demodulation is performed, because the modulation used in the transmitter of FIG. 5 is BPSK modulation. The demodulated signal is input to a first modulo adder 703, and the first modulo adder 703 performs modulo-2 addition using the pseudo random sequence used for transmission. The signal that underwent the modulo-2 addition is input to a second modulo adder 705 where it undergoes again modulo-2 addition with the used Walsh code. The signal that underwent the modulo-2 addition by the used Walsh code is input to an accumulation and cancellation unit 707, and the accumulation and cancellation unit 707 accumulates necessary signals and cancels unnecessary signals, thereby generating payload data.

Figure 8:
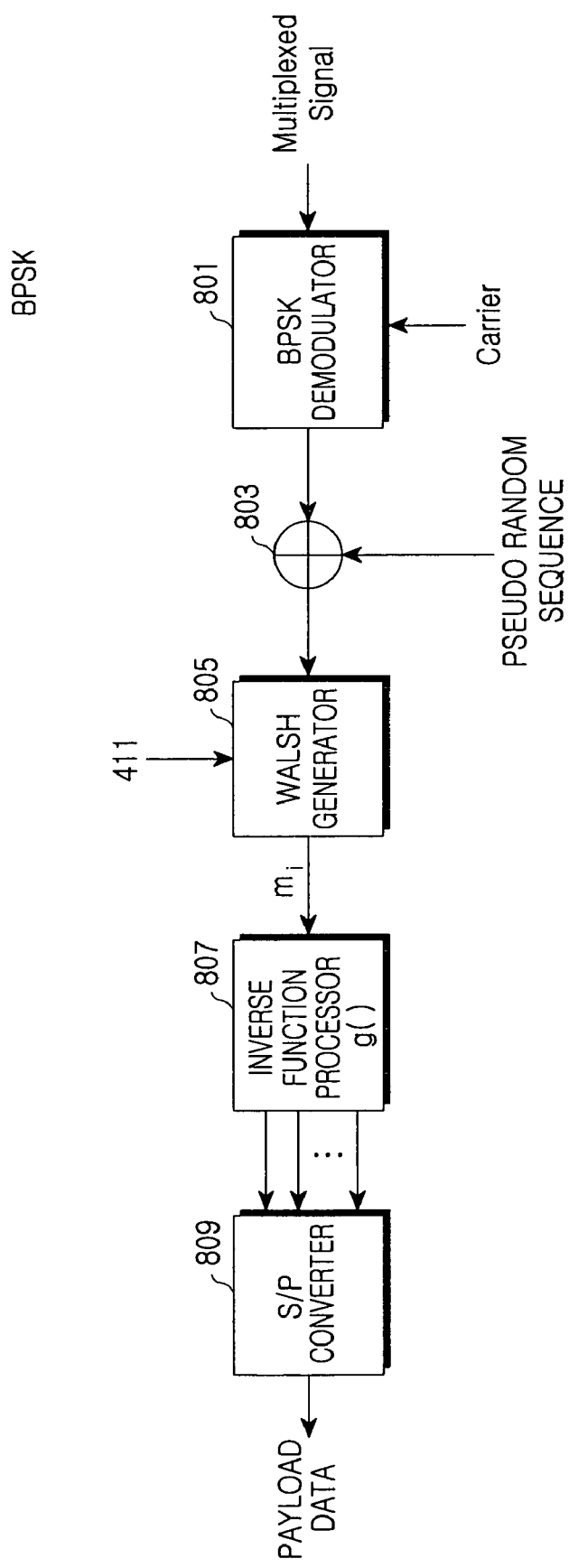
FIG. 8 is a block diagram of a receiver corresponding to the BPSK code modulation transmitter of FIG. 6 according to an exemplary embodiment of the present invention.

FIG. 8 is a block diagram of a receiver corresponding to the BPSK code modulation transmitter of FIG. 6 according to an exemplary embodiment of the present invention. With reference to FIG. 8, a description will now be made of a structure and operation of a receiver corresponding to the BPSK code modulation transmitter of FIG. 6 according to an exemplary embodiment of the present invention.

The received code-modulated signal is a signal modulated using a Walsh code. Therefore, the signal received at the receiver is input to a BPSK demodulator 801, and the BPSK demodulator 801 demodulates the modulated signal using a carrier signal. The demodulated signal is input to a modulo operator 803, and the modulo operator 803 performs a modulo operation on the demodulated signal using the pseudo random sequence used for transmission. The modulo operator 803 can be implemented with a modulo-2 operator as described in FIG. 6.

After the modulo operation, the modulo operator 803 outputs the results to a Walsh demodulator 805. The Walsh demodulator 805 performs Walsh demodulation on the signal that underwent the modulo operation. That is, the Walsh demodulator 805 generates the Walsh code information $m_i$ used for transmission. The generated Walsh code information $m_i$ is input to an inverse function processor 807, and the inverse function processor 807 performs an operation corresponding to the inverse function for the operation performed in the function processor of the transmitter using the input Walsh code information. The inverse function information can be provided during design of the receiver, or can be separately provided through a control channel. Therefore, the inverse function processor 807 in the receiver performs inverse function calculation using the demodulated Walsh code index. Because the function processor of the transmitter uses the one-to-one function, the inverse function processor of the receiver also uses the one-to-one function. Therefore, the signal output from the inverse function processor 807 has the same form as that of the information input to the function processor of the transmitter. As a result, the inverse function processor 807 generates parallel information from the code index information. The parallel information is input to a parallel-to-serial (P/S) converter 809, and the P/S converter 809 converts the parallel data into serial payload information.

Figure 9:
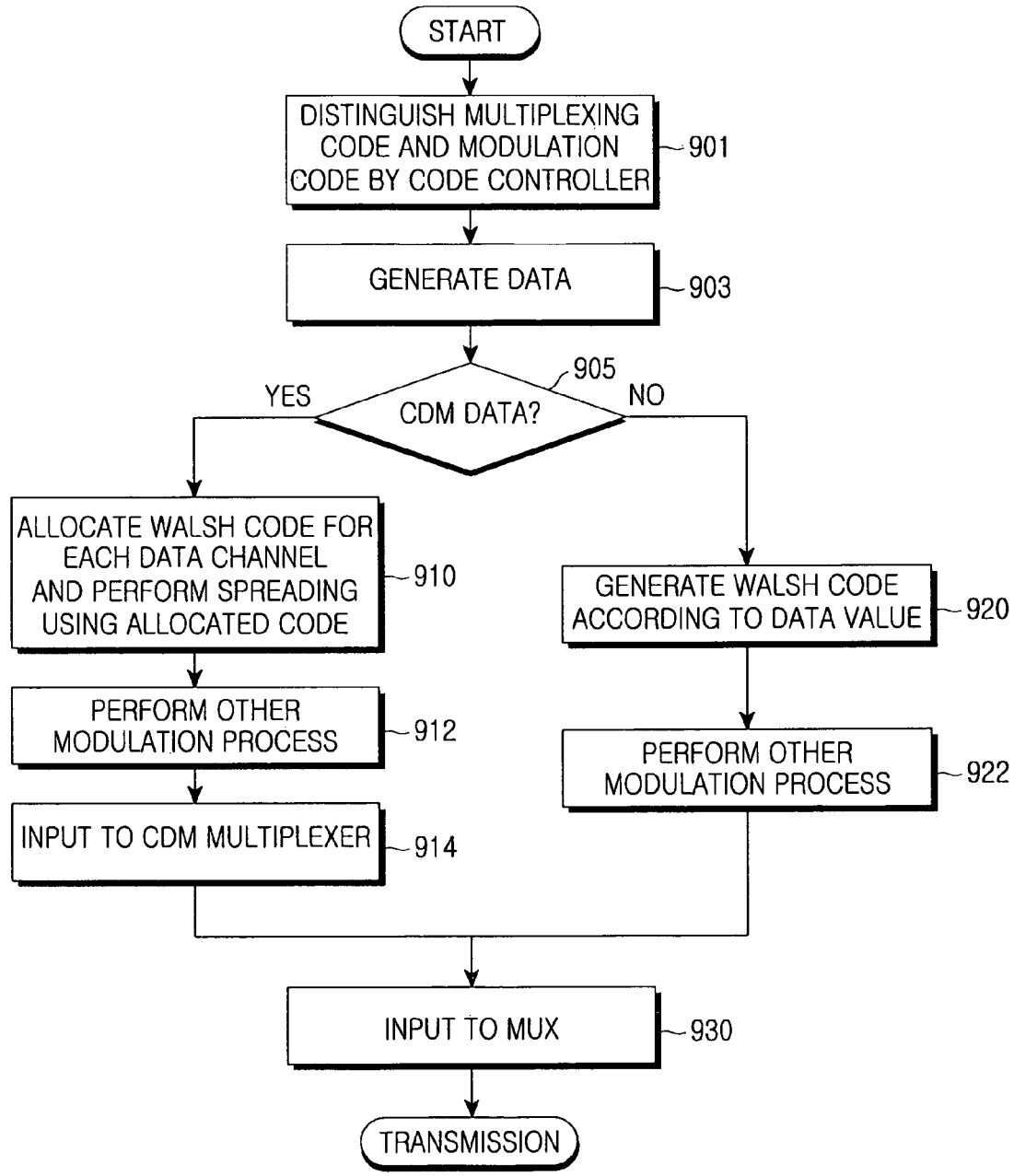
FIG. 9 is a flowchart illustrating a code modulation and CDM multiplexing process for a transmission signal according to an exemplary embodiment of the present invention.

FIG. 9 is a flowchart illustrating a code modulation and CDM multiplexing process for a transmission signal according to an exemplary embodiment of the present invention. With reference to FIG. 9, a description will now be made of a code modulation and CDM multiplexing process for a transmission signal according to an exemplary embodiment of the present invention.

In step 901, a transmitter distinguishes between multiplexing codes and modulation codes using a code controller 311. That is, the transmitter distinguishes between available Walsh codes and unavailable Walsh codes taking the multi-path fading into consideration. After the distinguishing, if transmission data is generated in step 903, the transmitter determines in step 905 whether the transmission data is CDM data. If it is determined in step 905 that the transmission data is CDM data, the transmitter proceeds to step 910. However, if the transmission data is not CDM data, the transmitter proceeds to step 920, considering that the transmission data is code modulation data.

In step 910, the transmitter allocates a Walsh code to each individual data channel, and spreads the CDM data depending on the allocated Walsh code. Thereafter, in step 912, the transmitter performs modulation according to the modulation used in the corresponding system. For example, if the modulation is BPSK modulation as used in FIGS. 5 and 6, the transmitter performs BPSK modulation. If the modulation is Quadrature Phase Shift Keying (QPSK) modulation, the transmitter performs QPSK modulation. If the modulation is 16-ary Quadrature Amplitude Modulation (16QAM) or 64-ary Quadrature Amplitude Modulation (64QAM), the transmitter performs 16QAM modulation or 64QAM modulation. The data modulated in this way is input to a CDM multiplexer where it is CDM-multiplexed in step 914.

However, if it is determined in step 905 that the transmission data is not CDM data but code modulation data, the transmitter generates a Walsh code corresponding to the data value in step 920. Thereafter, in step 922, the transmitter modulates the code modulation data according to modulation predefined in the system. That is, the transmitter performs the same modulation as that performed in step 912.

The signal code-modulated and/or CDM-multiplexed in step 914 and/or 922 is input to a multiplexer in step 930, where the signal is multiplexed and then transmitted over a corresponding band.

Because the transmitter may simultaneously transmit the CDM data and the code modulation data, the transmitter can simultaneously perform steps 910 to 914 and steps 920 to 922.

The transmitter can distinguish between the codes to be used for CDM multiplexing and the codes to be used for code modulation. Such a process can be predefined in the transmission/reception standard, or the corresponding information can be carried on the control data as described in FIG. 3. Therefore, the transmitter can perform modulation/multiplexing on the transmission data before transmission, using the predetermined Walsh codes for CDM multiplexing and code modulation.

Figure 10:
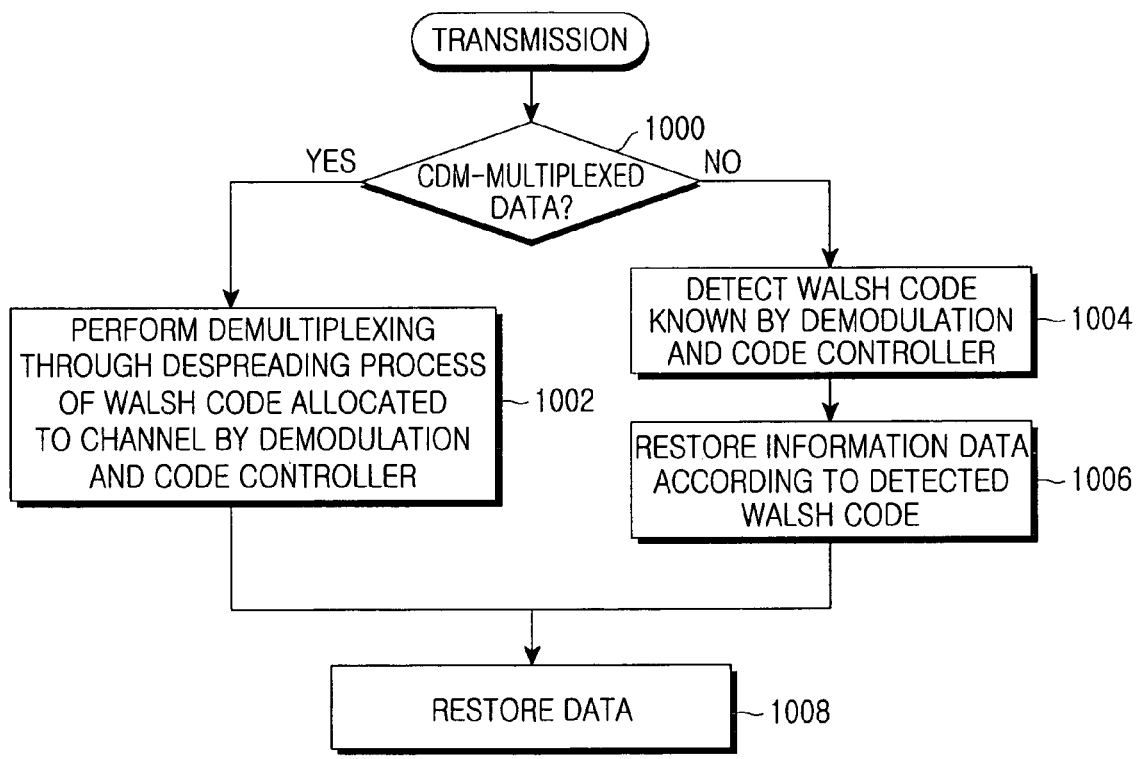
FIG. 10 is a flowchart illustrating a code modulation and CDM demultiplexing process for a received signal according to an exemplary embodiment of the present invention.

FIG. 10 is a flowchart illustrating a code modulation and CDM demultiplexing process for a received signal according to an exemplary embodiment of the present invention. With reference to FIG. 10, a description will now be made of a code modulation and CDM demultiplexing process for a received signal according to an exemplary embodiment of the present invention.

Upon receipt of a multiplexed signal, a receiver determines in step 1000 whether the received data is CDM-multiplexed data. If the received data is CDM-multiplexed data, the receiver proceeds to step 1002. Otherwise, if the received data is code-modulated data, the receiver proceeds to step 1004.

In step 1002, the receiver demodulates the received data, and demultiplexes the demodulated data using a despreading process of a Walsh code allocated to a channel by a code controller.

However, in step 1004, the receiver demodulates the received code-modulated data, and detects the Walsh code known by the code controller. After the code detection, the receiver restores information data corresponding to the detected Walsh code in step 1006.

After the restoration of the information data and/or CDM demultiplexing, the receiver performs data restoration in step 1008.

As described in FIG. 9, the transmitter previously determines the codes to be used for CDM multiplexing and the codes to be used for code modulation, or determines the codes as occasion demands, and provides the corresponding information as control information. Therefore, in FIG. 10, the receiver can perform the above process by determining whether it will receive code-modulated signals or CDM-multiplexed signal.

A detailed description will now be made of code modulation to better understand the exemplary embodiments of the present invention.

Assuming that among length-64 Walsh codes, 32 channels are used for the multiplexing technique, the remaining 32 Walsh codes are unused for data transmission. For example, assume that Walsh codes $W^{64}(32)$ to $W^{64}(63)$ are used for the multiplexing technique. Further, assume that a relationship between the Walsh codes $W^{64}(0)$ to $W^{64}(31)$ used for Walsh modulation and 5-bit input information 'm' is given as follows. A function f( ) indicating a relationship between a Walsh code index and an input bit stream 'i' is defined as "$i=f(m_i)$." For example, input information bits '00000' are modulated with $W^{64}(0)$, and input information bits '11111' are modulated with $W^{64}(31)$. In this case, the code controller 311 of FIG. 3 provides the above-described information to the receiver together with control information, and also provides the above-described information to the Walsh multiplexer and Walsh modulator of FIG. 3 so that the code controller 31 can transmit data in the above-described method.

The proposed CDM multiplexing and code modulation techniques according to an exemplary embodiment of the present invention will now be described with reference to S-DMB.

In the case of S-DMB, the code controller 311 of FIG. 3 selects Walsh codes to be used for multiplexing and Walsh codes to be used for modulation, and controls the selected codes. The Walsh codes to be used for multiplexing and the Walsh codes to be used for modulation should be exclusive to each other. That is, the Walsh codes used for code modulation cannot be used for CDM multiplexing, and the Walsh codes used for CDM multiplexing cannot be used for code modulation. The control data and the other information data are input to a CDM multiplexer where they are CDM-multiplexed by the Walsh codes. The code modulator selects one Walsh code allocated to a code modulator from an input data stream, and transmits the selected Walsh code, thereby performing code modulation.

Figure 11:
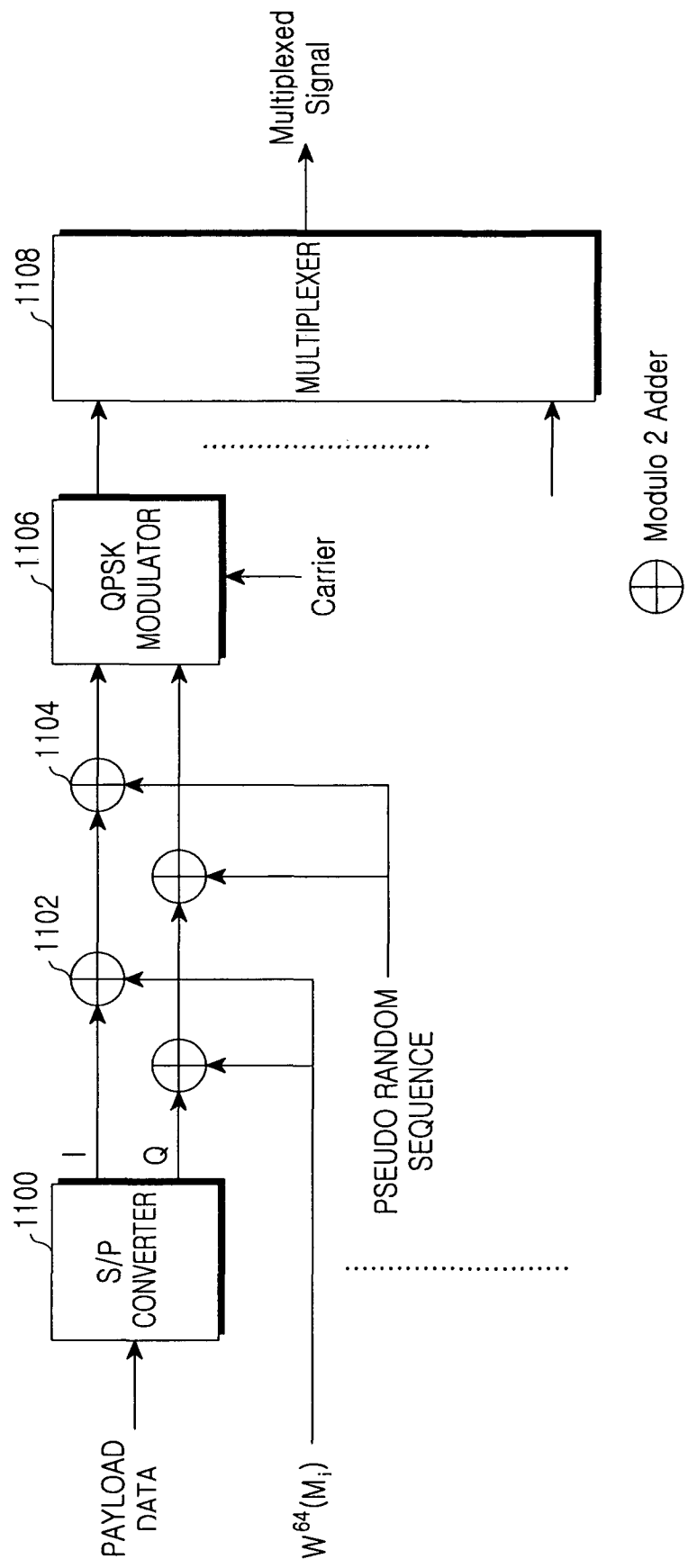
FIG. 11 is a block diagram of a CDM multiplexer based on the S-DMB standard according to an exemplary embodiment of the present invention.

FIG. 11 is a block diagram of a CDM multiplexer based on the S-DMB standard according to an exemplary embodiment of the present invention. A description of the CDM multiplexer will now be made in comparison with the CDM multiplexer of FIG. 5 according to an exemplary embodiment will now be made.

Compared with the CDM multiplexer of FIG. 5, the CDM multiplexer of FIG. 11 further includes a serial-to-parallel (S/P) converter 1100 for S/P-converting payload data. The S/P converter 1100 is used because the transmission data is divided into an I channel and a Q channel. Therefore, the I channel and the Q channel undergo the same modulo operation independently. Because a relationship between the I channel and the Q channel is well known, a description thereof will not be provided herein for clarity and conciseness. In addition, because the payload data transmitted in FIG. 11 is divided into the I channel and the Q channel, the Walsh code and the pseudo random sequence corresponding to each of the channels undergo modulo addition independently. In terms of the other operations, a first modulo adder 1102, second modulo adder 1104 and multiplexer 1108 of FIG. 11 are equivalent to the first modulo adder 501, second modulo adder 503 and multiplexer 507 of FIG. 5. Although BPSK modulation is used in FIG. 5, QPSK modulation in a QPSK modulator 1106 is used in FIG. 11. FIG. 11 is equal to FIG. 5 in terms of other structures and operations.

In FIG. 11, $M_i$ indicates a Walsh code index allocated for multiplexing by the code controller 311 of FIG. 3, among 64-length Walsh codes. Therefore, $W^{64}(m_i)$ indicates a Walsh code for multiplexing. If the number of Walsh codes allocated for Walsh multiplexing is A, $M_i$ is an element of $\{M_o, M_1, \ldots, M_{A-1}\}$.

Figure 12:
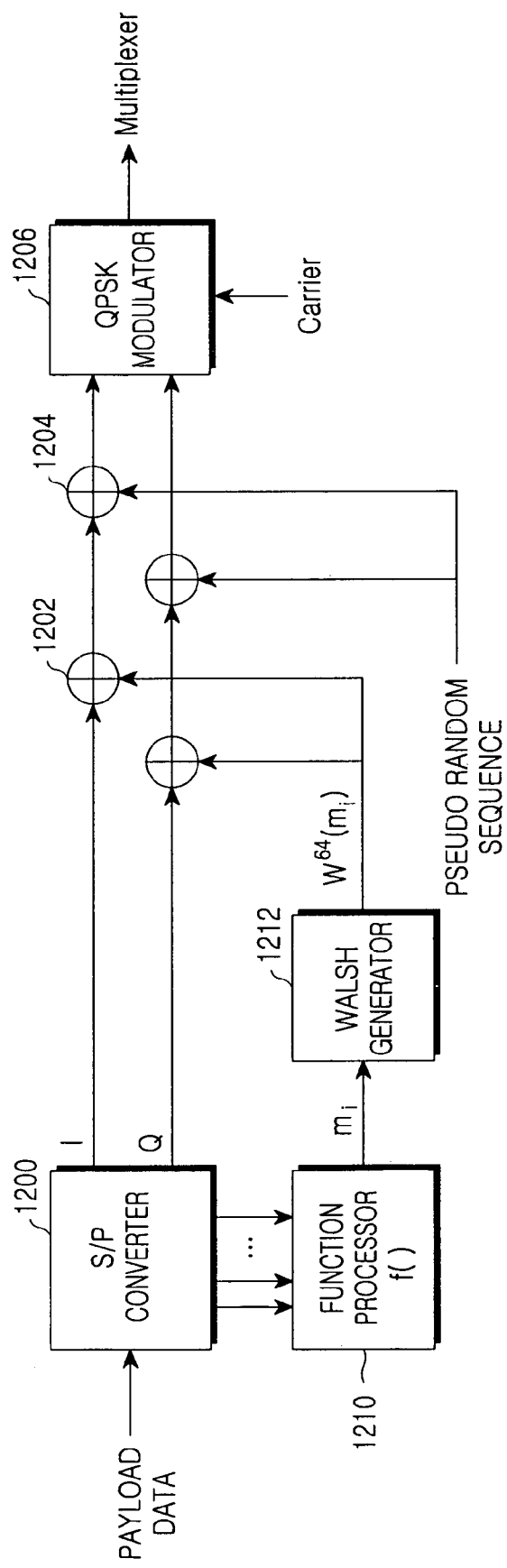
FIG. 12 is a block diagram of a code modulator based on the S-DMB standard according to an exemplary embodiment of the present invention.

FIG. 12 is a block diagram of a code modulator based on the S-DMB standard according to an exemplary embodiment of the present invention. With reference to FIG. 12, a description of the code modulator will now be made in comparison with the code modulator of FIG. 6 according to an exemplary embodiment of the present invention.

Similarly in FIG. 12, because data is transmitted through an I channel and a Q channel in S-DMB, the input payload data is divided into the I channel and the Q channel. A serial-to-parallel (S/P) converter 1200 S/P-converts input data, and outputs the resulting data to a function processor 1210. That is, of the input data bits, 2 bits are input as data of the I channel and the Q channel, and the remaining b=i data bits are input to the function processor 1210 that generates a Walsh index $m_i$ based on a one-to-one function f( ). That is, $m_i$=f(i). Here, f( ) is controlled by the code controller 311 of FIG. 3 such that the Walsh index used for the code modulator is $m_i$.

As a result, a Walsh generator 1212 generates a Walsh code $W^{64}(m_i)$ corresponding to the value $m_i$, and uses the Walsh code $W^{64}(m_i)$ as a spreading code. The code generated by the Walsh generator 1212 is commonly applied to the I channel and the Q channel, and a pseudo random sequence is also commonly applied to the I channel and the Q channel. As for the I channel, the data output from the S/P converter 1200 is spread in a first modulo adder 1202 by the Walsh code provided from the Walsh generator 1212, spread again in a second modulo adder 1204 by the pseudo random sequence, and then QPSK modulated in the QPSK modulator 1206.

The signal generated in FIG. 12 is input to the multiplexer 1108 of FIG. 11 as one input. That is, assuming that the number of Walsh codes allocated to the Walsh modulator of FIG. 12 by the code controller of FIG. 3 is denoted by B, and the number of Walsh codes used in FIG. 11 is denoted by A, a relationship between A and B is $$A+B \leq 64 \quad (1)$$

Therefore, the number 'b' of input data bits used in the Walsh generator 1212 is $$b = \lfloor \log_2 B \rfloor \quad (2)$$

where $\lfloor x \rfloor$ denotes an omission operator that takes only the integer part of 'x'.

Figure 13:
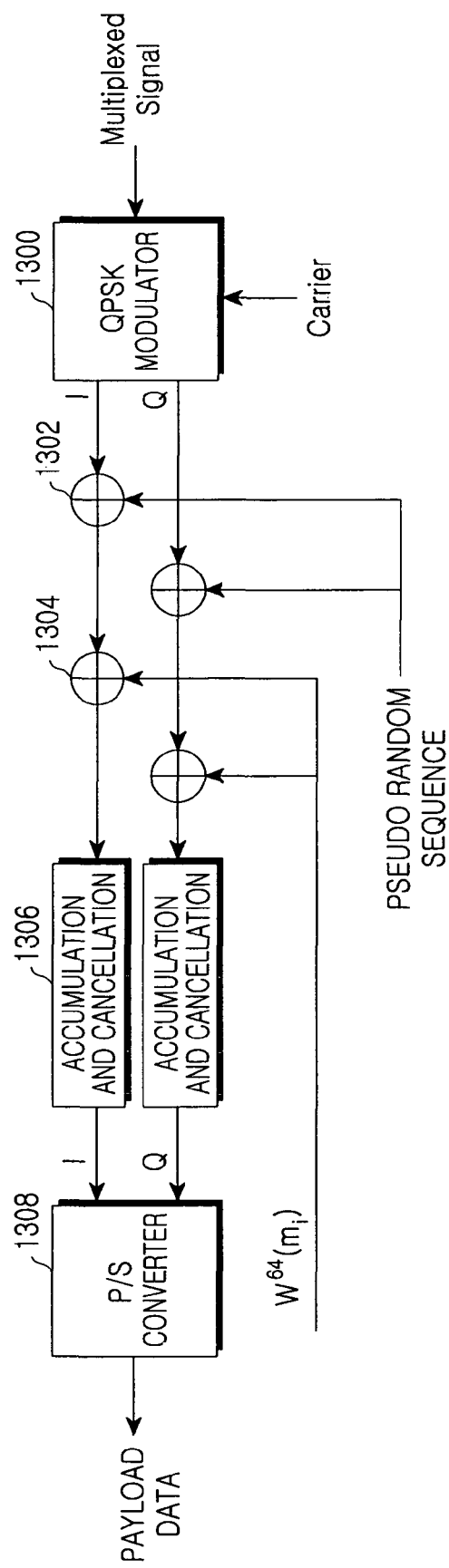
FIG. 13 is a block diagram of a CDM demultiplexer based on the S-DMB standard, corresponding to the CDM multiplexer of FIG. 11, according to an exemplary embodiment of the present invention.

FIG. 13 is a block diagram of a CDM demultiplexer based on the S-DMB standard, corresponding to the CDM multiplexer of FIG. 11, according to an exemplary embodiment of the present invention. With reference to FIG. 13, a description will now be made of a structure and operation of a CDM demultiplexer according to an exemplary embodiment of the present invention.

The CDM demultiplexer of FIG. 13 will now be described in comparison with the receiver of FIG. 7 according to an exemplary embodiment. Because the received signal was QPSK-modulated in the QPSK modulator 1300, the signal is QPSK-demodulated in FIG. 13. The QPSK-demodulated signal is divided into an I-channel signal and a Q-channel signal. Because the I-channel signal and the Q-channel signal both undergo the same process, only the I-channel signal will be described. The I-channel signal undergoes modulo operations by modulo operators 1302 and 1304. As to the modulo operations, a modulo operation is first performed by the pseudo random sequence used for transmission, and thereafter, a modulo operation is performed by the Walsh code allocated to the receiver. The signal that underwent the modulo operation is subject to accumulation and cancellation in an accumulation and cancellation unit 1306, and then input as an I-channel signal. Then a parallel-to-serial (P/S) converter 1308 converts the parallel input signal into a serial signal, and outputs the serial signal as payload data.

Figure 14:
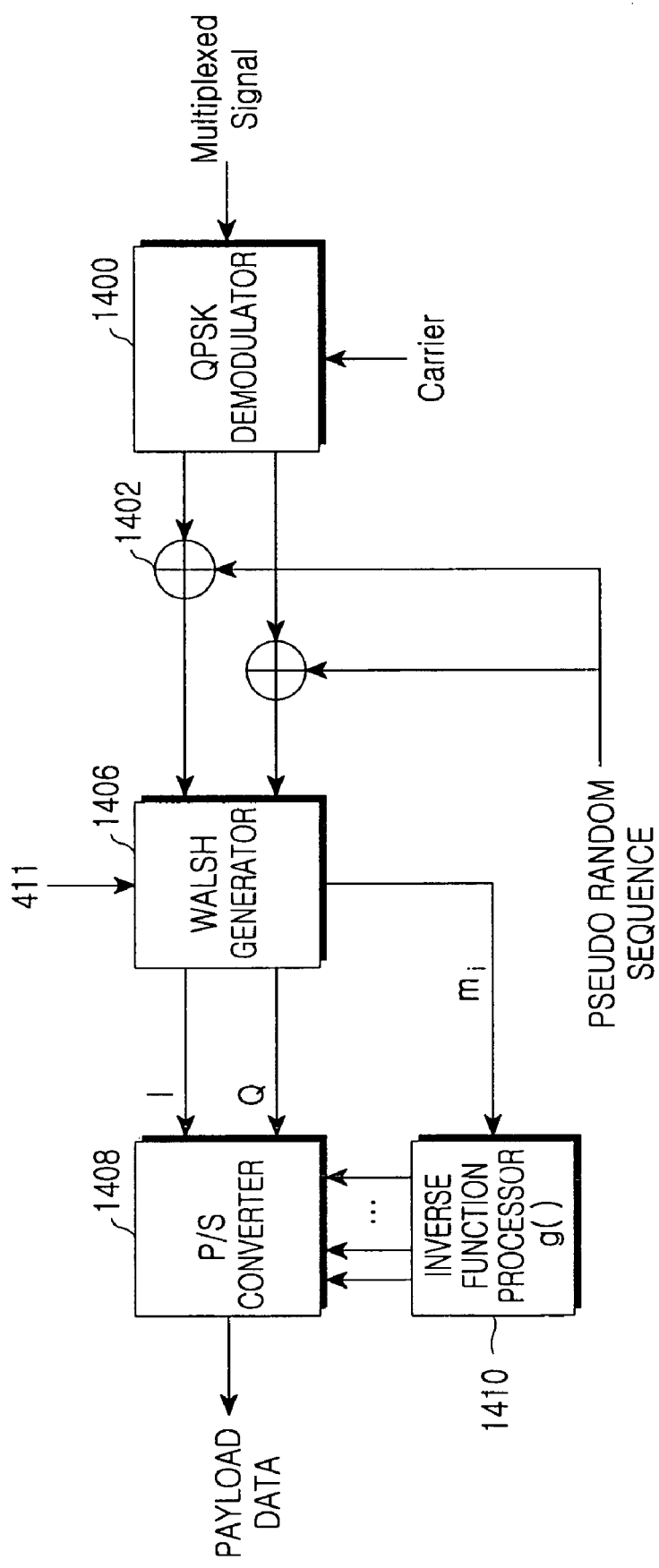
FIG. 14 is a block diagram of a code demodulator based on the S-DMB standard, corresponding to the code modulator of FIG. 12, according to an exemplary embodiment of the present invention.

FIG. 14 is a block diagram of a code demodulator based on the S-DMB standard, corresponding to the code modulator of FIG. 12, according to an exemplary embodiment of the present invention. With reference to FIG. 14, a description will now be made of a structure and operation of a code demodulator according to an exemplary embodiment of the present invention.

Similarly, the code demodulator of FIG. 14 will now be described in comparison with the receiver of FIG. 8 according to an exemplary embodiment of the present invention. FIG. 14 is different from FIG. 8 in that the signal is QPSK demodulated in the QPSK demodulator 1400, the I channel and the Q channel are used, and a part of the output of a Walsh demodulator 1406 is input to an inverse function processor 1410. This is because in the transmitter, a part of the transmission signal is converted based on the function processor 1210. The demodulator signal is input to a modulo operator 1402, and the modulo operator 1402 performs a modulo operation. After the modulo operation, the modulo operator 1402 outputs the results to a Walsh demodulator 1406. The Walsh demodulator 1406 outputs the remaining symbols except for the I-channel symbols and the Q-channel symbols among the input signals, to the inverse function processor 1410 as a value $m_i$. Then the inverse function processor 1410 takes an inverse function g( ) of the function f( ), and outputs the results to a parallel-to-serial (P/S) converter 1408. The inverse function processor 1410 generates Walsh index information, and provides the information to the P/S converter 1408 in parallel. Then the P/S converter 1408 generates payload data using the Walsh index information and the information of the I channel and the Q channel.

The code demodulator of FIG. 14 can be controlled by the code controller 411 of FIG. 4. If the reception operation is performed by the code controller 411 in this way, the code demodulator provides an index $m_i$ of the Walsh code where a received value is detected as the greatest value among the Walsh codes known by the code controller 311, to the inverse function processor 1410 that uses the inverse function g( ) of the function f( ) used for a mapping relation between the information bits and the Walsh code in the transmitter.

Verification of Effects of the Invention

An exemplary embodiment of the present invention proposes a modulation scheme that uses unused codes when the CDM multiplexing scheme cannot use some codes for multiplexing due to an influence of the wireless channel environment. Therefore, the present invention can recycle the unavailable codes, thereby increasing system capacity. Such effects will now be verified.

If the signal transmitted with each Walsh code is denoted by $w_i(t)$, and the transmitter transmits signals using Walsh codes #0 to #(n−1), a transmission signal x(t) can be expressed as $$x(t) = \sum_{i=0}^{n-1} w_i(t) \quad (3)$$

A signal-to-interference ratio S/I at a receiver that receives information on a $k^{th}$ Walsh code can be defined as $$S/I = \frac{E[w_k(t)^2]}{E[(x(t) - w_k(t)^2)]} \quad (4)$$

$$= \frac{E[w_k(t)^2]}{E\left[\left(\sum_{i=0}^{n-1} w_i(t) - w_k(t)\right)^2\right]}$$

$$= \frac{1}{n-1}$$

It is assumed in Equation (4) that an average of Walsh codes is '0', a correlation between Walsh codes is '0', and all Walsh codes are equal in their power. Therefore, as shown in Equation (4), when n Walsh codes are used for transmission, S/I of each channel is 1/(n−1).

If the minimum S/I required by the system is denoted by $(S/I)_{req}$, the required S/I can be expressed as $$(S/I)_{req} \leq S/I = \frac{1}{n-1} \quad (5)$$

Therefore, the number of available channels should satisfy the condition of Equation (6) below.

$$n \leq (S/I)_{req}^{-1} + 1 \quad (6)$$

Here, if it is assumed that one Walsh code is BPSK-modulated as it is and one bit is transmitted with one Walsh code, then the number of the bits that can be simultaneously transmitted is n.

For convenience, assume that the total number of Walsh codes is 64 and $(S/I)_{req}=1/31$. In this case, the maximum number 'A' of codes used for Walsh code multiplexing by Equation (6) is 32. Assuming that signals are transmitted using BPSK modulation, the amount of data that can be simultaneously transmitted using the Walsh code multiplexing as done in the conventional method is 32 bits. In this case, S/I=1/31. If 31 codes are used for the Walsh code multiplexing to provide the same S/I environment, and Walsh modulation is performed using 32 codes among the remaining 33 codes, the total number of transmittable bits is $31+\log_2 32$. As a result, 36 bits can be transmitted.

Therefore, in the same S/I condition, while the conventional multiplexing method transmits 32 bits, the novel multiplexing method can transmit 4 additional bits.

As can be understood from the foregoing description, when the CDM multiplexing scheme cannot use some codes for multiplexing due to an influence of the wireless channel environment, exemplary embodiments of the present invention transmits additional data through a modulation scheme using the unused codes, thereby increasing the system capacity.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. An apparatus for transmitting data in a wireless communication system using Code Division Multiplexing (CDM), the apparatus comprising:
    a code controller for distinguishing a Walsh code used for spreading during data transmission and a Walsh code unused for spreading based on a signal-to-interference ratio required by the system, and separately providing the Walsh codes;
    a CDM multiplexer for CDM-multiplexing input data using the Walsh code used for spreading provided from the code controller;
    a code modulator for modulating input data using the Walsh code unused for spreading provided from the code controller; and
    a multiplexer for multiplexing outputs of the CDM multiplexer and the code modulator.

2. The apparatus of claim 1, wherein the CDM multiplexer comprises:
    a first modulo operator for performing a modulo operation on input data using the Walsh code used for spreading;
    a second modulo operator for performing a modulo operation on an output signal of the first modulo operator using a pseudo random sequence;
    a modulator for modulating an output signal of the second modulo operator using a carrier in a transmission band according to a modulation scheme; and
    a multiplexer for multiplexing the modulated signal.

3. The apparatus of claim 2, wherein the first and second modulo operators performs a modulo-2 operation.

4. The apparatus of claim 2, wherein if the data is transmitted through an I channel and a Q channel, the apparatus further comprises a serial-to-parallel converter for converting the serial input data into parallel data, wherein the first and second modulo operators perform a modulo operation on the I-channel signal and the Q-channel signal, respectively.

5. The apparatus of claim 4, wherein the first and second modulo operators performs a modulo-2 operation.

6. The apparatus of claim 1, wherein the code modulator comprises:
    a serial-to-parallel converter for converting serial input data into parallel data;
    a function processor for converting the parallel data into a value based on a one-to-one function;
    a Walsh generator for generating a Walsh code from the code controller depending on the value and information on the Walsh code unused for spreading;
    a modulator operator for performing a modulo operation on the generated Walsh code using a pseudo random sequence; and
    a modulator for modulating a signal output from the modulo operator using a carrier signal in a transmission band according to a modulation scheme.

7. The apparatus of claim 6, wherein the first and second modulo operators performs a modulo-2 operation.

8. The apparatus of claim 1, wherein the code modulator comprises:
    a serial-to-parallel converter for converting serial input data into an I-channel signal and a Q-channel signal in parallel in units of a reference size;
    a function processor for converting the parallel signal into a value based on a one-to-one function;
    a Walsh generator for generating a Walsh code from the code controller depending on the value and information on the Walsh code unused for spreading;
    a first modulo operator for performing a modulo operation on the generated Walsh code using the I-channel signal and the Q-channel signal;
    a second modulo operator for performing a modulo operation on a signal output from the first modulo operator; and
    a modulator for modulating a signal output from the second modulo operator using a carrier signal in a transmission band according to a modulation scheme.

9. A method for transmitting data in a wireless communication system using Code Division Multiplexing (CDM), the method comprising:
    distinguishing a Walsh code used for spreading during data transmission and a Walsh code unused for spreading based on a signal-to-interference ratio required by the system, and separately providing the Walsh codes;
    CDM-multiplexing transmission data using the Walsh code used for spreading, when CDM-multiplexing of the transmission data is required;
    modulating transmission data using the Walsh code unused for spreading, when code-modulating of the transmission data is required; and
    multiplexing the CDM-multiplexed signal and the code-modulated signal.

10. The method of claim 9, wherein the CDM multiplexing comprises:
performing a first modulo operation on the input transmission data using the Walsh code used for spreading;
performing a second modulo operation on the signal of the first modulo operation, using a pseudo random sequence;
modulating the signal of the second modulo operation using a carrier in a transmission band according to a modulation scheme; and
multiplexing the modulated signal.

11. The method of claim 9, wherein if the transmission data is transmitted through an I channel and a Q channel, the method further comprises:
converting the data into parallel data;
performing a first modulo operation on the I-channel signal and the Q-channel signal using the Walsh code used for spreading;
performing a second modulo operation on the signal of the first modulo operation using a pseudo random sequence;
modulating the signal of the second modulo operation using a carrier in a transmission band according to a modulation scheme; and
multiplexing the modulated signal.

12. The method of claim 9, wherein the code modulating comprises:
converting the serial input data into parallel data;
converting the parallel data into a value based on a one-to-one function;
generating a Walsh code depending on the value and information on the Walsh code unused for spreading;
performing a modulo operation on the generated Walsh code using a pseudo random sequence; and
modulating the signal of the modulo operation using a carrier signal in a transmission band according to a modulation scheme.

13. The method of claim 9, wherein the code modulating comprises:
converting the serial input data into an I-channel signal and a Q-channel signal;
converting the serial input data into a parallel signal in units of a reference size;
converting the parallel signal into a value based on a one-to-one function;
generating a Walsh code depending on the value and information on the Walsh code unused for spreading;
performing a first modulo operation on the generated Walsh code using the I-channel signal and the Q-channel signal;
performing a second modulo operation on the signal of the first modulo operation using a pseudo random sequence; and
modulating the signal of the second modulo operation, using a carrier signal in a transmission band according to a modulation scheme.

14. An apparatus for receiving data in a wireless communication system using Code Division Multiplexing (CDM), the apparatus comprising:
a code controller for extracting a Walsh code used for code modulation and a Walsh code used for CDM multiplexing from a control signal in a received CDM-multiplexed signal;
a CDM demultiplexer for CDM-demultiplexing the CDM-multiplexed signal in a received multiplexed signal via the Walsh code used for the CDM multiplexing; and
a code demodulator for code-demodulating a code-modulated signal in the received multiplexed signal via the Walsh code used for the CDM multiplexing,
wherein the Walsh code used for the code modulation is not used in the CDM multiplexing based on a signal-to-interference ratio required by the system.

15. The apparatus of claim 14, wherein the CDM demultiplexer comprises:
a demodulator for demodulating a received signal using a carrier signal in a transmission band;
a first modulo operator for performing a modulo operation on the demodulated signal using a pseudo random sequence;
a second modulo operator for performing a modulo operation on an output of the first modulo operator from the code controller using the Walsh code used for CDM multiplexing; and
an accumulation and cancellation unit for canceling an unnecessary signal and accumulating a necessary signal in the signal of the second modulo operation.

16. The apparatus of claim 14, wherein the CDM demultiplexer comprises:
a demodulator for demodulating a received signal into an I-channel signal and a Q-channel signal using a carrier signal in a transmission band;
a first modulo operator for performing a modulo operation on the demodulated I-channel signal and Q-channel signal using a pseudo random sequence;
a second modulo operator for performing a modulo operation on an output of the first modulo operator from the code controller using the Walsh code used for CDM multiplexing;
an accumulation and cancellation unit for canceling a unnecessary signal and accumulating a necessary signal in the signal of the second modulo operation; and
a parallel-to-serial converter for converting the I-channel signal and the Q-channel signal into a serial signal.

17. The apparatus of claim 14, wherein the code demodulator comprises:
a demodulator for demodulating a received signal using a carrier signal in a transmission band;
a modulo operator for performing a modulo operation on the demodulated signal using a pseudo random sequence;
a Walsh demodulator for Walsh-demodulating the signal of the modulo operation from the code controller using the Walsh code used for Walsh modulation;
a function processor for converting the Walsh-demodulated signal into a specific signal using a one-to-one function; and
a parallel-to-serial converter for converting a signal output from the function processor into a serial signal.

18. The apparatus of claim 14, wherein the code demodulator comprises:
a demodulator for demodulating a received signal into an I-channel signal and a Q-channel signal using a carrier signal in a transmission band;
a modulo operator for performing a modulo operation on the demodulated I-channel signal and Q-channel signal using a pseudo random sequence;
a Walsh demodulator for Walsh-demodulating the signals of the modulo operation from the code controller using the Walsh code used for Walsh modulation and generating a sequence in a reference size;
a function processor for generating a specific signal from the sequence in the reference size using a one-to-one function; and a parallel-to-serial converter for converting a signal output from the function processor and the demodulated I-channel signal and Q-channel signal into a serial signal.

19. A method for demodulating data in a wireless communication system using Code Division Multiplexing (CDM), the method comprising:

extracting a Walsh code used for code modulation and a Walsh code used for CDM multiplexing from a control signal in a received CDM-multiplexed signal;

CDM-demultiplexing the CDM-multiplexed signal in a received multiplexed signal based on the Walsh code used for the CDM multiplexing; and code-demodulating a code-modulated signal in the received multiplexed signal based on the Walsh code used for the CDM multiplexing, wherein the Walsh code used for the code modulation is not used in the CDM multiplexing based on a signal-to-interference ratio required by the system.

20. The method of claim 19, wherein the CDM demultiplexing comprises:

demodulating a received signal using a carrier signal in a transmission band;

performing a first modulo operation on the demodulated signal using a pseudo random sequence;

performing a second modulo operation on the signal of the first modulo operation using the Walsh code used for CDM multiplexing; and canceling an unnecessary signal and accumulating a necessary signal in the signal of the second modulo operation.

21. The method of claim 19, wherein the CDM demultiplexing comprises:

demodulating a received signal into an I-channel signal and a Q-channel signal using a carrier signal in a transmission band;

performing a first modulo operation on the demodulated I-channel signal and Q-channel signal using a pseudo random sequence;

performing a second modulo operation on the signal of the first modulo operation using the Walsh code used for CDM multiplexing;

canceling an unnecessary signal and accumulating a necessary signal in the signal of the second modulo operation; and converting the I-channel signal and the Q-channel signal into a serial signal.

22. The method of claim 19, wherein the code demodulating comprises:

demodulating a received signal using a carrier signal in a transmission band;

performing a modulo operation on the demodulated signal using a pseudo random sequence;

Walsh-demodulating the signal of the modulo operation, using the Walsh code used for Walsh modulation; and converting the Walsh-demodulated signal into a specific signal using a one-to-one function; and converting the specific signal generated using the one-to-one function into a serial signal.

23. The method of claim 19, wherein the code demodulating comprises:

demodulating a received signal into an I-channel signal and a Q-channel signal using a carrier signal in a transmission band;

performing a modulo operation on the demodulated I-channel signal and Q-channel signal using a pseudo random sequence;

Walsh-demodulating the signals of the modulo operation using the Walsh code used for Walsh modulation, and generating a sequence in a reference size;

generating a signal from the sequence in the reference size using a one-to-one function; and converting the generated signal and the demodulated I-channel signal and Q-channel signal into a serial signal.

24. An apparatus for transmitting and receiving data in a wireless communication system using Code Division Multiplexing (CDM), the apparatus comprising:

a code controller for distinguishing a Walsh code used for spreading during data transmission and a Walsh code unused for spreading based on a signal-to-interference ratio required by the system, separately providing the Walsh codes, and extracting the Walsh code used for code modulation and the Walsh code used for CDM multiplexing from a control signal in a received CDM-multiplexed signal;

a CDM multiplexer for CDM-multiplexing input data from the code controller using the Walsh code used for spreading;

a CDM demultiplexer for CDM-demultiplexing the CDM-multiplexed signal in a received multiplexed signal;

a code modulator for modulating input data from the code controller using the Walsh code unused for spreading;

a code demodulator for code-demodulating a code-modulated signal in the received multiplexed signal; and a multiplexer for multiplexing outputs of the CDM multiplexer and the code modulator.

25. A method for transmitting and receiving data in a wireless communication system using Code Division Multiplexing (CDM), the method comprising:

distinguishing a Walsh code used for spreading during data transmission and a Walsh code unused for spreading based on a signal-to-interference ratio required by the system, and separately providing the Walsh codes;

extracting the Walsh code used for code modulation and the Walsh code used for CDM multiplexing from a control signal in a received CDM-multiplexed signal;

CDM-multiplexing transmission data using the Walsh code used for spreading, when CDM-multiplexing of the transmission data is required;

CDM-demultiplexing the CDM-multiplexed signal in a received multiplexed signal;

modulating transmission data using the Walsh code unused for spreading, when code-modulating of the transmission data is required;

code-demodulating a code-modulated signal in the received multiplexed signal; and multiplexing the CDM-multiplexed signal and the code-modulated signal.

* * * * *